(12) United States Patent
Das Gupta et al.

(10) Patent No.: US 12,211,081 B2
(45) Date of Patent: Jan. 28, 2025

(54) METHOD AND SYSTEMS FOR RECOMMENDING PRODUCT BUNDLES

(71) Applicant: Target Brands, Inc., Minneapolis, MN (US)

(72) Inventors: Aparupa Das Gupta, San Francisco, CA (US); Anupama Joshi, San Francisco, CA (US); Gregory Olsen, St. Paul, MN (US); Saloni Agarwal, Baltimore, MD (US)

(73) Assignee: Target Brands, Inc., Minneapolis, MN (US)

(*) Notice: Subject to any disclaimer, the term of this patent is extended or adjusted under 35 U.S.C. 154(b) by 123 days.

(21) Appl. No.: 17/531,399

(22) Filed: Nov. 19, 2021

(65) Prior Publication Data
US 2023/0162258 A1 May 25, 2023

(51) Int. Cl.
*G06Q 30/0601* (2023.01)

(52) U.S. Cl.
CPC ..... *G06Q 30/0631* (2013.01); *G06Q 30/0633* (2013.01)

(58) Field of Classification Search
CPC ............ G06Q 30/0631; G06Q 30/0633
USPC ............................... 705/26.1–27.2
See application file for complete search history.

(56) References Cited

U.S. PATENT DOCUMENTS

| | | |
|---|---|---|
| 6,317,722 B1 | 11/2001 | Jacobi et al. |
| 8,250,012 B1 | 8/2012 | Whitman et al. |
| 8,285,602 B1 | 10/2012 | Yi et al. |
| 8,438,052 B1 | 5/2013 | Chanda et al. |
| 8,781,917 B2 | 7/2014 | Westphal et al. |
| 10,387,922 B2 | 8/2019 | Gopalsamy et al. |
| 10,991,026 B2 | 4/2021 | Agarwal et al. |
| 2011/0099061 A1 | 4/2011 | Giffin et al. |
| 2014/0222506 A1* | 8/2014 | Frazer .......... G06Q 30/02 705/7.29 |
| 2015/0363872 A1 | 12/2015 | Weinhold et al. |

(Continued)

FOREIGN PATENT DOCUMENTS

CA 2971661 A1 12/2017

OTHER PUBLICATIONS

PartsSource launches new E-commerce platform. (2019, Jun. 08). Plus Company Updates Retrieved from https://dialog.proquest.com/professional/docview/2237748043?accountid=131444 (Year: 2019).*

*Primary Examiner* — Jeffrey A. Smith
(74) *Attorney, Agent, or Firm* — Merchant and Gould, PC

(57) ABSTRACT

Methods and systems for providing a product bundle recommendation are disclosed. One method includes receiving a selection of a first product. Data relating to historical customer shopping activity and data describing online shopping sessions in which products are selected for addition to historical shopping carts to which the first product was previously added is accessed. A list bundled products having a complementary relationship with the first product is generated. At least one product from the list of bundled products is selected and the at least one product is presented on a user interface on a customer device as a recommendation for purchase with the first product. A filter may be applied to the list of bundled products, such as a price filter. The method may be performed by a system including one or more computing devices communicating via a network with one or more data storage devices.

19 Claims, 13 Drawing Sheets

(56) References Cited

U.S. PATENT DOCUMENTS

| | | |
|---|---|---|
| 2016/0189257 A1 | 6/2016 | Dicker et al. |
| 2016/0350832 A1* | 12/2016 | Franklin ............ G06Q 30/0631 |
| 2018/0247363 A1 | 8/2018 | Agarwal et al. |
| 2019/0220916 A1 | 7/2019 | Levy et al. |
| 2021/0342701 A1* | 11/2021 | Ayush ................. G06F 18/2193 |
| 2022/0155940 A1* | 5/2022 | Olbrich .............. G06Q 30/0631 |
| 2022/0292566 A1* | 9/2022 | Silverstein ......... G06Q 30/0641 |

* cited by examiner

METHOD AND SYSTEMS FOR RECOMMENDING PRODUCT BUNDLES

BACKGROUND

Retail websites, including pages displaying details regarding an individual item, often include product recommendations for other items or products a user may be interested in, to encourage a user to buy additional products while he or she visits the retail website. For example, a user may be presented with a list of products complementary to the product that is currently being viewed, or a user may be presented with a list of products similar to the product that is being viewed.

At times, a retailer may wish to adjust the recommendations presented to the user based on the product attributes associated with the product that a user is shopping for. For example, the retailer may wish to present complementary products in response to a user selecting a particular television that the user is considering for purchase (e.g., cables required for connecting to home stereo equipment, speaker systems, etc.). There is currently not a convenient way for retailers to adjust or filter product recommendations to provide a more meaningful experience to consumer users in accordance with adjustments desired by the retailer. Therefore, improvements in the manner in which a retailer can control the presentation of product recommendations are needed.

SUMMARY

In general, the present disclosure relates to a product bundles recommendation server. In a first aspect, example systems for providing a product recommendation on a retailer website are described. An example system includes a computing system including a data store, a processor, and a memory communicatively coupled to the processor. The memory stores instructions executable by the processor to: receive, from a customer device, a selection of a first product offered for sale via the retailer website; access the data store to retrieve customer add to cart data, product price data, and degree of diversity data, wherein: the customer add to cart data is based on historical customer shopping activity of a plurality of customers and includes data describing online shopping sessions in which products are selected for addition to historical shopping carts to which the first product was previously added, and the customer add to cart data further includes data describing an order in which the products are added to the historical shopping carts to which the first product was previously added; based on the selection of the first product and the customer add to cart data, generate a list of bundled products having a complementary relationship with the first product, wherein, in the historical customer shopping activity, the bundled products have been selected after the selection of the first product more than a threshold number of times; select at least one bundled product from the list of bundled products; and present the at least one bundled product on a user interface on the customer device as a recommendation for purchase with the first product.

In a second aspect, example methods for providing a product recommendation are described. An example method includes receiving, from a customer device, a selection of a first product offered for sale via a retailer website; accessing a data store to retrieve customer add to cart data, product price data, and degree of diversity data, wherein: the customer add to cart data is based on historical customer shopping activity and includes data describing online shopping sessions in which products are selected for addition to a historical shopping cart to which the first product was previously added, the customer add to cart data further includes data describing an order in which the products are added to the historical shopping cart to which the first product was previously added, and the degree of diversity data includes product similarity data including a product similarity score between two products based on a comparison of product attributes; based on the selection of the first product and the customer add to cart data, generating a list of bundled products, wherein the list of bundled products includes one or more additional products that have been selected after the selection of the first product in the historical customer shopping activity more than a threshold number of times; selecting at least one bundled product from the list of bundled products; and presenting the at least one bundled product on a user interface on the customer device as a recommendation for purchase with the first product.

In a third aspect, example systems for providing a product recommendation are described. An example system includes a computing system including a data store, a processor, and a memory communicatively coupled to the processor. The memory stores instructions executable by the processor to: receive, from a customer device, a selection of a first product offered for sale via a retailer website; access the data store to retrieve customer add to cart data, product price data, and degree of diversity data, wherein: the customer add to cart data is based on historical customer shopping activity and includes data describing online shopping sessions in which products are selected for addition to a historical shopping cart to which the first product was previously added, the customer add to cart data further includes data describing an order in which the products are added to the historical shopping cart to which the first product was previously added, and the degree of diversity data includes product similarity data having a product similarity score between two products based on a comparison of product attributes; based on the selection of the first product and the customer add to cart data, generate a list of bundled products, wherein the list of bundled products includes one or more additional products that, in the historical customer shopping activity, have been selected after the selection of the first product more than a threshold number of times; based on a price of the first product, generate a product recommendation price range; based on a product category of the first product, determine a degree of diversity for the product recommendation; select from the list of bundled products at least one bundled product, the selected at least one bundled product having a price within the product recommendation price range and meeting the determined degree of diversity; and present the at least one bundled product on a user interface on the customer device as a recommendation for purchase with the first product.

DETAILED DESCRIPTION

Figure 1:
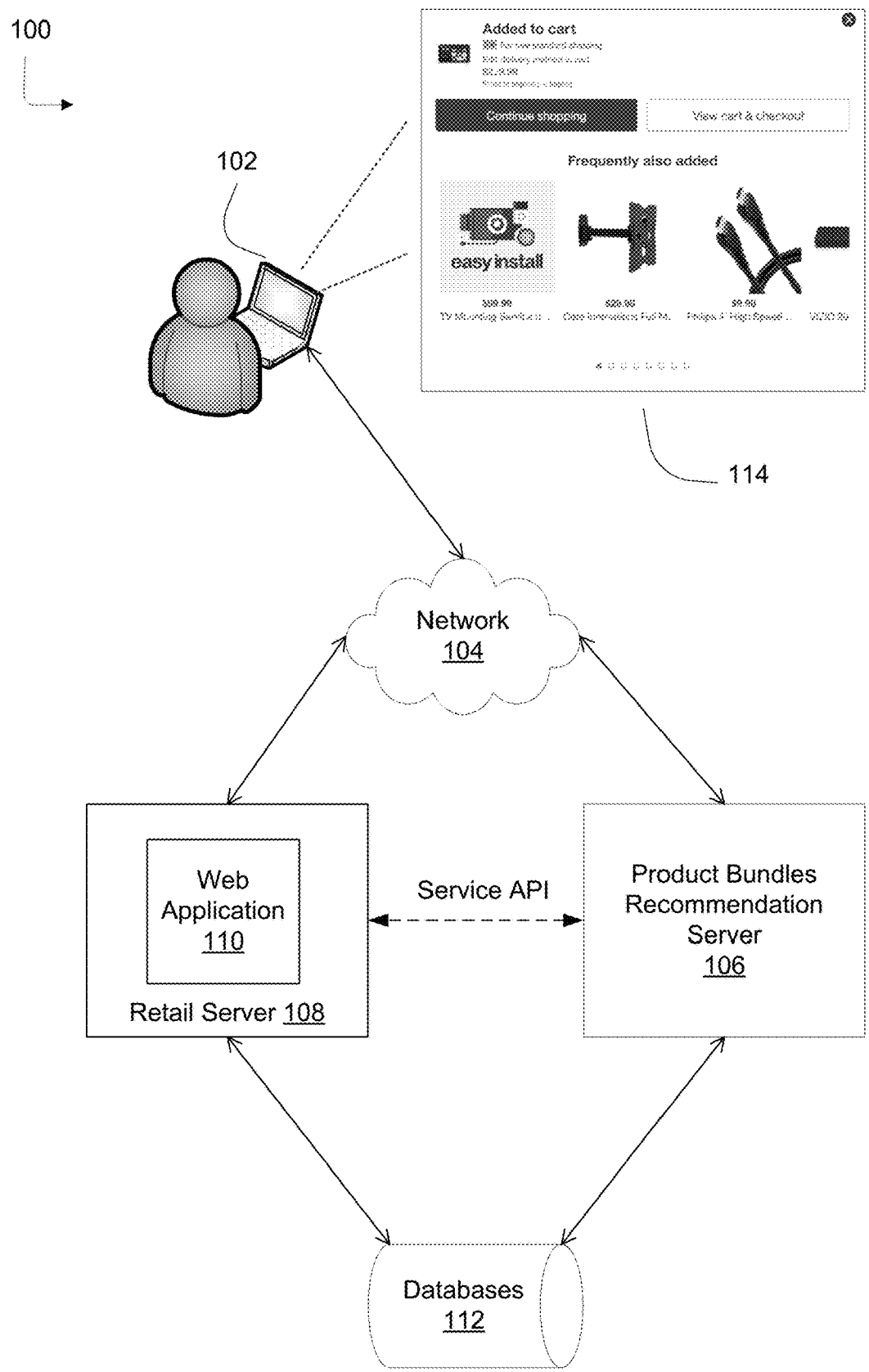
FIG. 1 illustrates an example environment in which the product bundles recommendation server may be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

As briefly described above, embodiments of the present invention are directed to a product bundles recommendation server that may be integrated with a retailer website. In particular aspects, the product bundles recommendation server allows a retailer to recommend complementary or bundled products to a user or a customer based on a user viewing a first item or product, also called a "seed product," that is offered for sale on a retailer website. Additionally, the product bundles recommendation server allows a retailer to apply limiting factors or filters to further control the products within a bundle recommended to a user.

The product bundles recommendation server described herein allows the retailer to collect and analyze historical add to cart data including the order in which users place products in online shopping carts. Users may shop for products in a logical manner by adding a first product to a shopping cart followed by other products that are complementary to the first product. Thus, the first product drives the user to select the additional products. By tracking the order in which products are added to shopping carts the server can identify which product drives a user to select other complementary products. Complementary relationships between products may be identified and used to generate a list of bundled products to present to a user based on a user first selecting a seed product. A wide range of controls provided by the server allows the retailer to provide product recommendations that are more meaningful to the user. For example, recommended product bundles may be meaningful in terms of pricing by including a price filter to ensure all recommended products within a bundle are priced similarly to (or in some logical relation to) a seed product that has been selected.

Referring first to FIG. 1, an example environment 100 in which the product bundles recommendation server may be implemented is displayed. In the example shown, a retail server 108 hosts a web application 110, such as an application that may be displayed on a customer device 102. The customer device 102, for example mobile or desktop computing devices, may access the web application 110 via a network 108, such as the Internet.

In an example embodiment, the web application 110 corresponds to a retailer website at which a user may shop for products. That is, a request to view a retailer web site may be received at the web application 110 from a customer device 102. The web application 110 may then access databases 112 containing product information. The product information can include, for example, a plurality of products carried by the retailer and attributes associated with each product carried by the retailer. In general, the retail server 108, web application 110, and databases 112 are associated with a retail enterprise, and the customer device 102 is a computing device that is owned or controlled by a user or customer of the retailer.

In the example shown, the retail server 108 may access a product bundles recommendation server 106. The product bundles recommendation server 106 operates to provide product recommendations to be displayed on a retailer website after a user has selected a seed product. The product bundles recommendation server 106 communicates with one or more databases 112 to access product data and data associated with the order in which users add products to an online shopping cart. Databases 112 may be external and updated in real time as new data and information becomes available. Based on data from databases 112, the product bundles recommendation server 106 generates a list of bundled products that are complementary to a seed product that a user has selected. In example embodiments, after the product bundles recommendation server 106 has generated a list of bundled products, limiting factors or filters may be applied to the list before any products are recommended to the user. For example, a filter may be applied to eliminate products from the list that do not have a price within a particular price range. After the list of bunded products has been generated and filtered, recommended product bundles may be sent through the network 104 to a customer device 102 where the recommended products may be presented on a display 114 of the customer device 102.

The product bundles recommendation server 106 may be configured to execute one or more algorithms or programs for generating a list of bundled products that are complementary to a seed product that has been selected by a user to add to his or her online shopping cart on a retailer website hosted by a retail server, (e.g., when viewed from a website or web application 110). In some examples, the product bundles recommendation server 106 may directly receive data usable by the algorithms or programs for generating lists of bundled products. In other examples, the product bundles recommendation server 106 may access pre-stored data, for example data stored at retail server 18 (or another server within a retail enterprise). In example embodiments, the product bundles recommendation server 106 may implement a plurality of different available recommendation algorithms. In such embodiments, the product bundles recommendation server 106 may be configured to display available recommendation algorithms that may be selected by an administrative user. The product bundles recommendation server 106 is described further below, for example, with respect to FIGS. 2-5.

Figure 2:
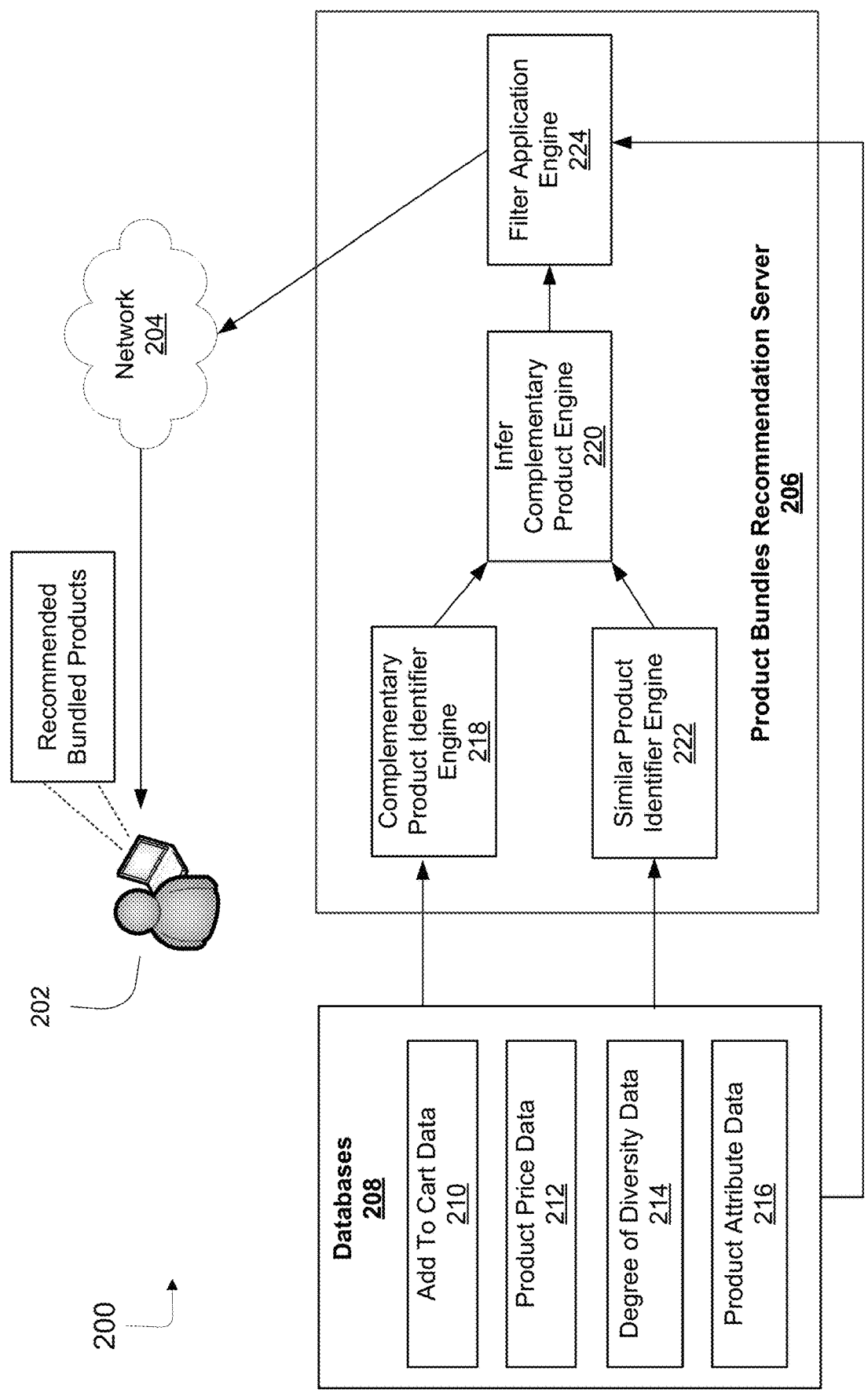
FIG. 2 illustrates a block diagram of an example architecture of the product bundles recommendation server, according to an example embodiment.

FIG. 2 illustrates a block diagram of an example architecture 200 of the product bundles recommendation server, according to an example embodiment. In the example shown, information is stored in external databases 208, including, but not limited to, add to cart data 210, product price data 212, degree of diversity data 214, and product attribute data 216. Add to cart data 210 is based on historical customer shopping activity and includes data describing online shopping sessions in which products are selected for addition to historical shopping carts to which a seed product was previously added, for a variety of different customer users. The online shopping sessions may include sessions where any customer user made a purchase of at least one product. Add to cart data 210 further includes the order in which customers add products to a historical online shopping cart. In some examples, the add to cart data includes timestamps corresponding to the time at which products are added to a historical shopping cart. Product price data 212 includes pricing information associated with each product offered for sale by the retailer.

Degree of diversity data 214 includes category information associated with each product offered for sale by the retailer. For example, each product may be categorized into at least one category. Examples of such categories include grocery, household essentials, clothing, baby, electronics, kitchen and dining, personal care, and pets. For each category, the degree of diversity data 214 includes an associated degree of diversity score. The degree of diversity score reflects the amount of diversity or variance to include in a product bundle recommended to a user. More specifically, the degree of diversity score associated with a seed product's category may determine the level of diversity of the product bundle recommended to a user. For example, if a user selects a seed product that is categorized into a category with a high degree of diversity score, or a degree of diversity above a predetermined threshold, the product bundle recommended to the user will include products that are more diverse from the seed product. In examples, the electronics category may have a high degree of diversity score. For example, a user who selects a television as a seed item may be more likely to purchase additional products that are diverse from the television (e.g., cables, remote, television mount), versus additional products that are similar to the television (e.g., a television made by a different manufacturer or having a different screen size). Similarly, in examples, the grocery category may have a lower degree of diversity score. For example, a user who indicates interest in a package of vanilla yogurts may be more likely to purchase additional products that are similar to the yogurt (e.g., blueberry yogurts), versus additional products that are diverse from the yogurt (e.g., pasta), so those similar products might be appropriate to be presented as potentially bundled for purchase with the originally-selected item. The product similarity score may be generated by comparing product attributes using product attribute data 216. Product attribute data 216 includes information about each product offered for sale by a retailer.

In the example shown, the product bundles recommendation server 206 may include a complementary product identifier engine 218, a similar product identifier engine 222, and an infer complementary product engine 220. The functionality of the complementary product identifier engine 218, the similar product identifier engine 222, and the infer complementary product engine 220, are described in more detail below, for example, with respect to FIGS. 3-5. The complementary product identifier engine 218 receives add to cart data 210 and identifies trends in the order in which diverse customer users add products to their respective historical shopping carts. In examples, if a threshold number of users who first added a seed product to a historical shopping cart also added a second product to the historical shopping cart, the second product is identified as complementary to the seed product. For example, if a threshold number of customers who first added a particular car seat to their shopping cart also added a particular backseat mirror to their shopping cart, then the complementary product identifier engine 218 may identify the car seat and the backseat mirror as complementary products.

In the example shown, the similar product identifier engine 222 receives data from the databases 208 to identify products that are similar to one another. In examples, the similar product identifier engine 222 may compare product attribute data 216 for two products and determine a product similarity score. If the product similarity score is above a predetermined threshold, the similar product identifier engine 222 may identify the two products as similar such that they can be substituted with one another. In examples, if the product similarity score for two products is above a predetermined threshold, as determined by the similar product identifier engine 222, one product may be substituted with the other product, if, for example, one product is out of stock.

The infer complementary product engine 220 receives information on complementary products from the complementary product identifier engine 218 and information on similar products from the similar product identifier engine 222 to predict and infer complementary relationships between products. Based on known and inferred complementary relationships between products, a list of complementary products may be generated. The infer complementary product engine 220 is described below in more detail, for example, with respect to FIG. 3 and FIG. 4.

The list of complementary products can be transmitted from the infer complementary product engine 220 to a filter application engine 224, where limiting factors or controls may be applied to the list of complementary products. The operation of the filter application engine 224 is described in more detail below, for example, with respect to FIG. 10. The filter application engine may access the databases 208. In an example, one filter that may be applied by the filter application engine 224 to the list of complementary products is a degree of diversity filter. To apply the degree of diversity filter, the filter application engine 224 may access the degree of diversity data 214 and determine a degree of diversity for the product recommendation based on the category of the seed product. The filter application engine 224 may then eliminate any products from the list of complementary products that do not meet the determined degree of diversity. In another example, one filter that may be applied by the filter application engine 224 to the list of complementary products is a price filter. To apply the price filter, the filter application engine 224 may access product price data 212 and generate a product recommendation price range based on the price of the seed product. In examples, the product recommendation price range may include prices above and below the price of the seed product. In other examples, the upper limit of the product recommendation price range may be the price of the seed product, such that no recommended products are more expensive than the seed product. The filter application engine 224 may eliminate any products from the list of complementary products that do not have a price within the product recommendation price range.

In examples, the filter application engine 224 may apply more than one filter to the list of complementary products. For example, the filter application engine 224 may apply both a degree of diversity filter and a price filter, such that the complementary products remaining on the list after the filters are applied are within a determined degree of diversity and also have prices within a determined price range.

In the example shown, after a list of complementary products has been identified and any applicable filters applied by the filter application engine 224, at least one complementary product from the list may be transmitted over a network 204 to a customer device 202, where the at least one complementary product may be presented on a user interface of the customer device 202 as a recommendation of a product to bundle for purchase with a seed product.

Figure 3:
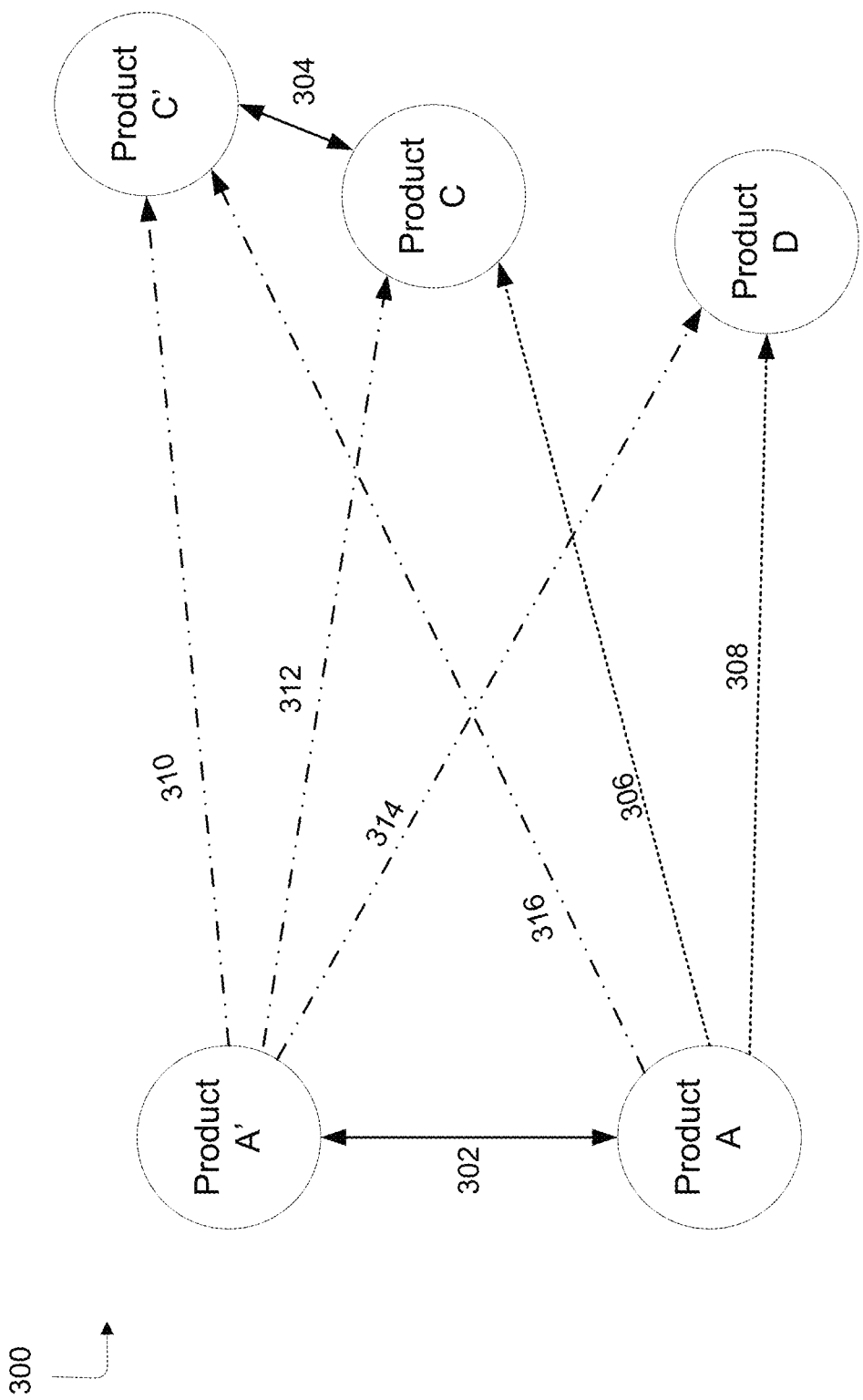
FIG. 3 illustrates a graphical representation of an example product relationship network, according to an example embodiment.

FIG. 3 is a graphical representation of a product relationship network 300, according to an example embodiment. FIG. 3 further illustrates a graphical representation of product relationships determined by the complementary product identifier engine 218, the similar product identifier engine 222, and the infer complementary product engine 220. The product relationship network 300 include a plurality of nodes, where each node represents a product offered for sale by a retailer. Each link or edge between nodes represents a relationship or interaction between two products. The product relationship network 300 maintains a plurality of edges between a plurality of nodes, including complementary relationships, similarity relationships, and inferred complementary relationships as determined by the complementary product identifier engine 218, the similar product identifier engine 222, and the infer complementary product engine 220.

In the example shown, the similar product identifier engine 222 has determined that Product A and Product A' have a similarity score above a predetermined threshold, so there is a similar product link or edge 302 between Product A and Product A'. The similar product identifier engine 222 has also determined that Product C and Product C' have a similarity score above a predetermined threshold, so there is a similar product link 304 between Product C and Product C'. In the example shown, the complementary product identifier engine 218 has determined that, based on Product C being added to a historical shopping cart by customers who previously added Product A more than a threshold number of times, Product A and Product C are complementary products, so there is a complementary product link or edge 306 between Product A and Product C. Similarly, the complementary product identifier engine 218 has determined that, based on Product D being added to a historical shopping cart by customers who previously added Product A more than a threshold number of times, Product A and Product D are complementary products, so there is a complementary product link 308 between Product A and Product C.

In the example shown, links 310, 312, 314, and 316 are edges or links generated by the infer complementary product engine 220 based on the similar product links determined by the similar product identifier engine 222 and the complementary product links determined by the complementary product identifier engine 218. The infer complementary product engine 220 is able to infer product relationships based on the existence of links between other pairs of products already present in the network 300 to identify additional links in the network of products 300. Specifically, the complementary product identifier engine 222 is configured to infer direct complementary relationships between two nodes within the product relationship network 300 based on the two nodes being connected by a multi-step path. For example, because Product A and Product C were determined to be complementary products, and because Product A and Product A' were determined to be similar products, the infer complementary product engine 220 infers that Product A' and Product C are complementary products. Thus, based on the first link between Product A and Product C, and the second link between Product A and Product A', a complementary product link 312 is inferred between Product A' and Product C. By training on existing product relationships to infer additional relationships and hidden links in the network 300, the product bundles recommendation server is more scalable and efficient, and increases the reach of potential recommendations to items where data representative of complementary or similar products may otherwise be sparse.

Figure 4:
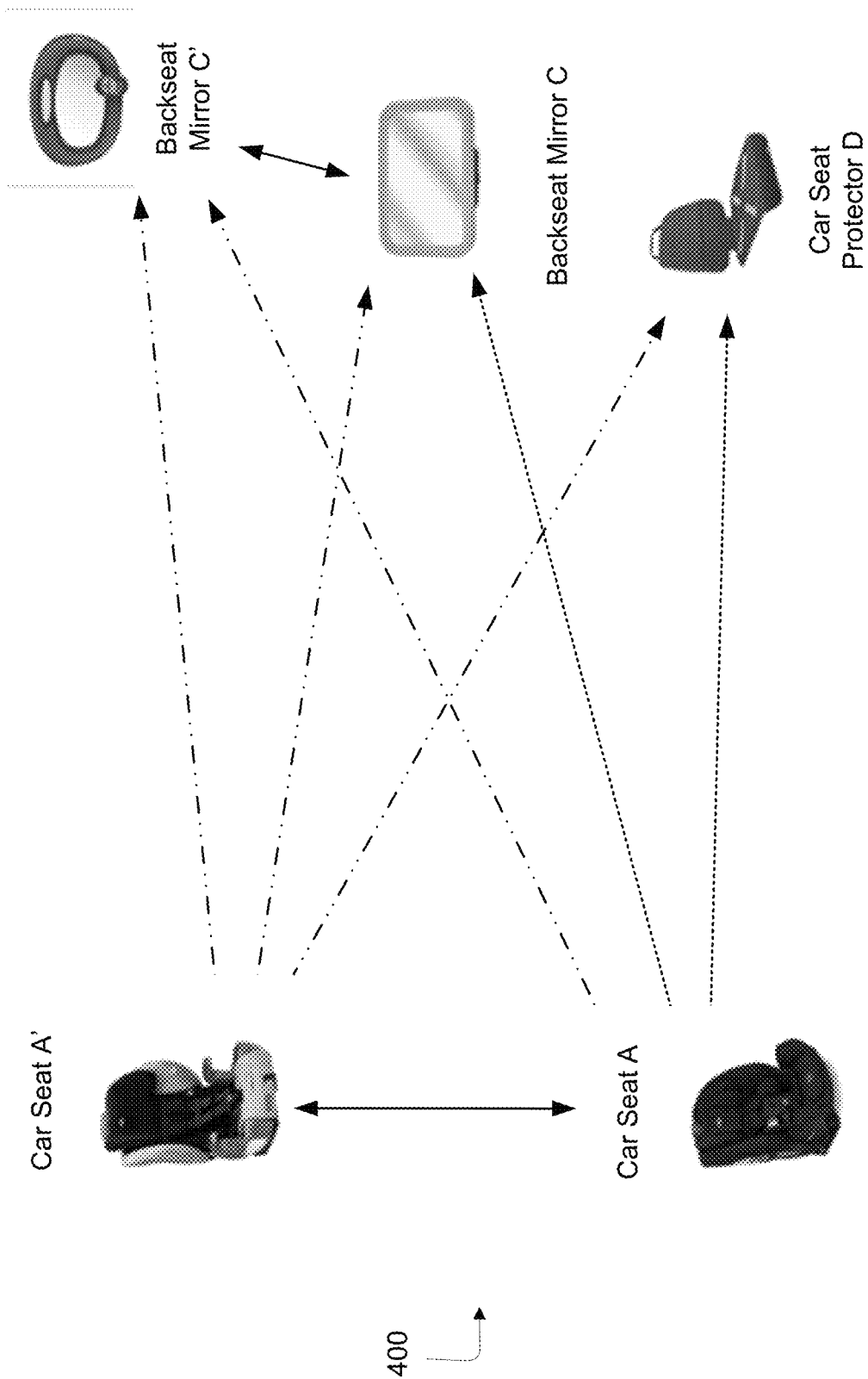
FIG. 4 illustrates another graphical representation of an example product relationship network, according to an example embodiment.

FIG. 4 is another graphical representation of a product relationship network 400, according to an example embodiment. FIG. 4 illustrates complementary relationships, similar relationships, and predicted complementary relationships as determined by the complementary product identifier engine 218, the similar product identifier engine 222, and the infer complementary product engine 220. In the example shown, the similar products identifier engine 222 has determined that two different car seats A, A' are similar products, based on product attributes associated with both car seats. The similar products identifier engine 222 has also determined that two different back seat mirrors C, C' are similar products. The complementary product identifier engine 318 has determined that backseat mirror C and car seat protector D are both complementary products to car seat A based on historical customer shopping activity indicating that more than a threshold number of customers who first added car seat A to their online shopping cart also added backseat mirror C or car seat protector D. In the example shown, based on the similar product links and the complementary product links, the infer complementary product engine 220 has inferred multiple additional complementary relationships. Specifically, the infer complementary product engine 220 has inferred that backseat mirror C', backseat mirror C, and car seat protector D are complementary products to car seat A'. Additionally, the infer complementary product engine 220 has inferred that backseat mirror C is a complementary product to car seat A.

Figure 5:
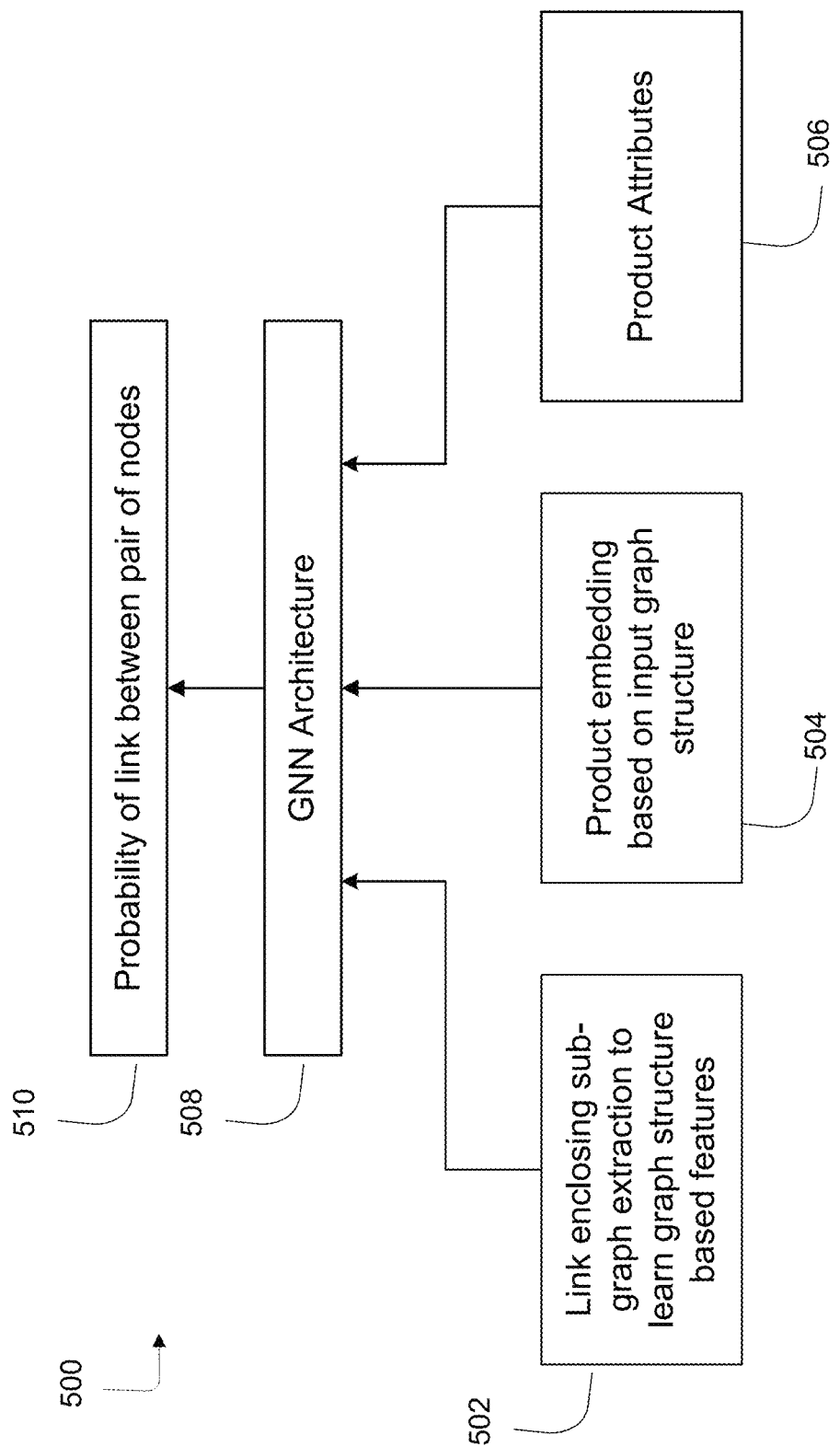
FIG. 5 illustrates an example flowchart for predicting product relationships within a product relationship network using a Graph Neural Network, according to an example embodiment.

FIG. 5 illustrates an example flowchart 500 for inferring or predicting product relationships within a product relationship network using a Graph Neural Network (GNN). The example flowchart as shown in FIG. 5 may be carried out by the infer complementary product engine 220. In the examples describe herein, a machine-learning model may include one or more GNNs configured to learn an edge function between nodes within a fully-connected network. For example, a model may be trained using existing edges or links determined from add-to-cart data in order to predict the probability of an edge or link between two nodes within the network for which an edge is not otherwise derived directly from the add to cart data. A hidden state of each node evolves over time by exchanging information with its neighboring nodes via message passing. Weights in the model are shared across nodes, which gives the model the ability to handle a different number of inputs, which is relevant because the number of products in a recommended bundle can vary.

In the example shown, input features 502, 504, and 506 are provided to the GNN architecture 508 to output a probability of a link existing between a pair of nodes 510. Specifically, the example framework 500 may process a representation of a set of products as a graph with each node in the graph representing a product and each edge representing a relationship between products. A machine-learning model may include a GNN model that includes an extraction layer 502 configured to convert a plurality of products and product relationships into an initial graph. Thus, graph structures are learned and extracted based on known products and relationships. The GNN model may further include a product embedding layer 504 to learn vector representations of nodes in the graph and improve prediction of links. Additional details of the architecture and use of GNNs, extraction layers, and embeddings for link prediction are provided in U.S. patent application Ser. No. 16/858,361 and U.S. patent application Ser. No. 16/855,761, which are hereby incorporated by reference in their entirety. Still further details regarding use of such a GNN for link prediction are described in Zhang et al., "Link Prediction Based on Graph Neural Networks", 32nd Conference on Neural Information Processing Systems (NIPS 2018), the disclosure of which is hereby incorporated by reference in its entirety.

Figure 6:
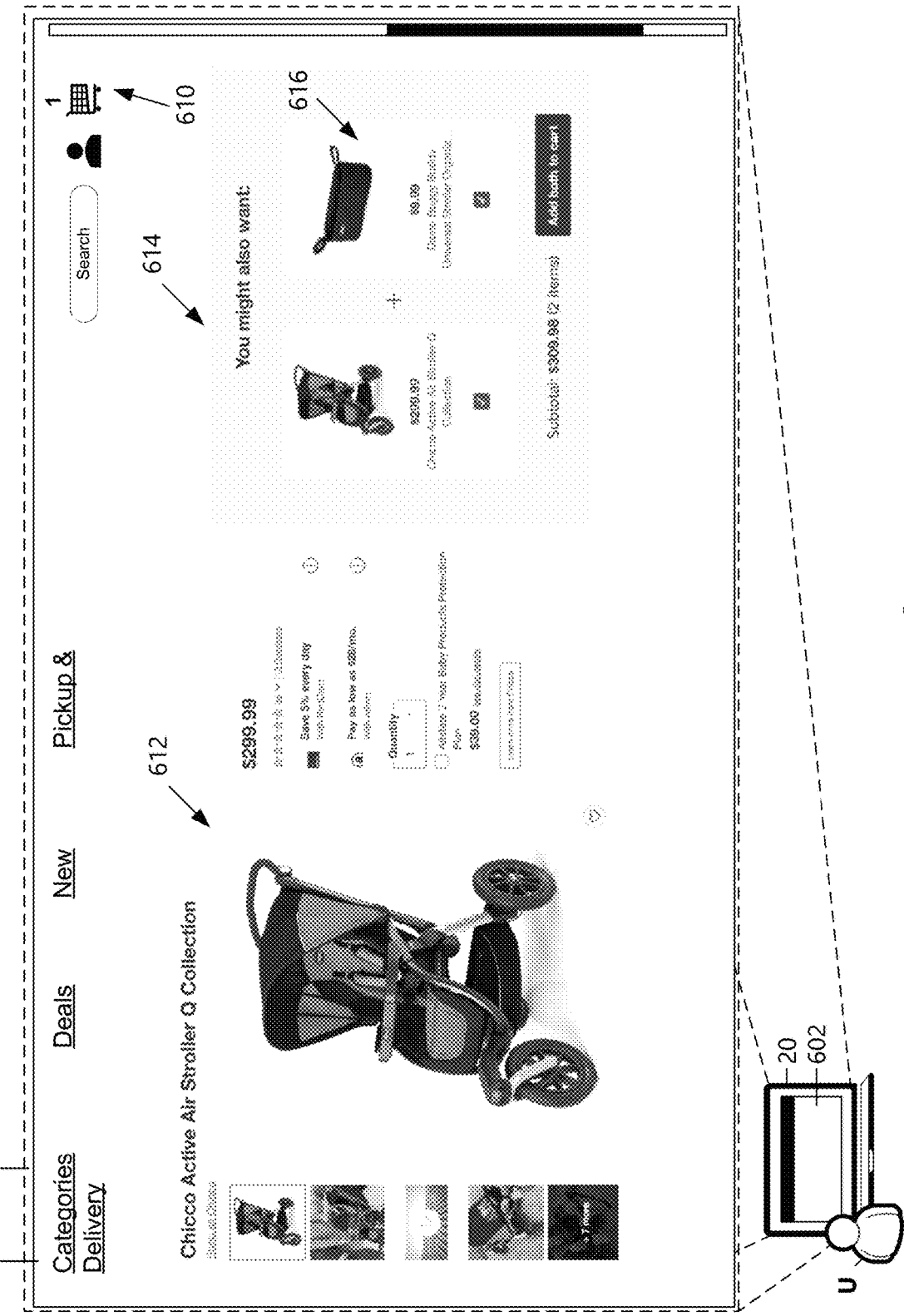
FIG. 6 illustrates an example user interface displaying a recommended product bundle, according to an example embodiment.
Figure 7:
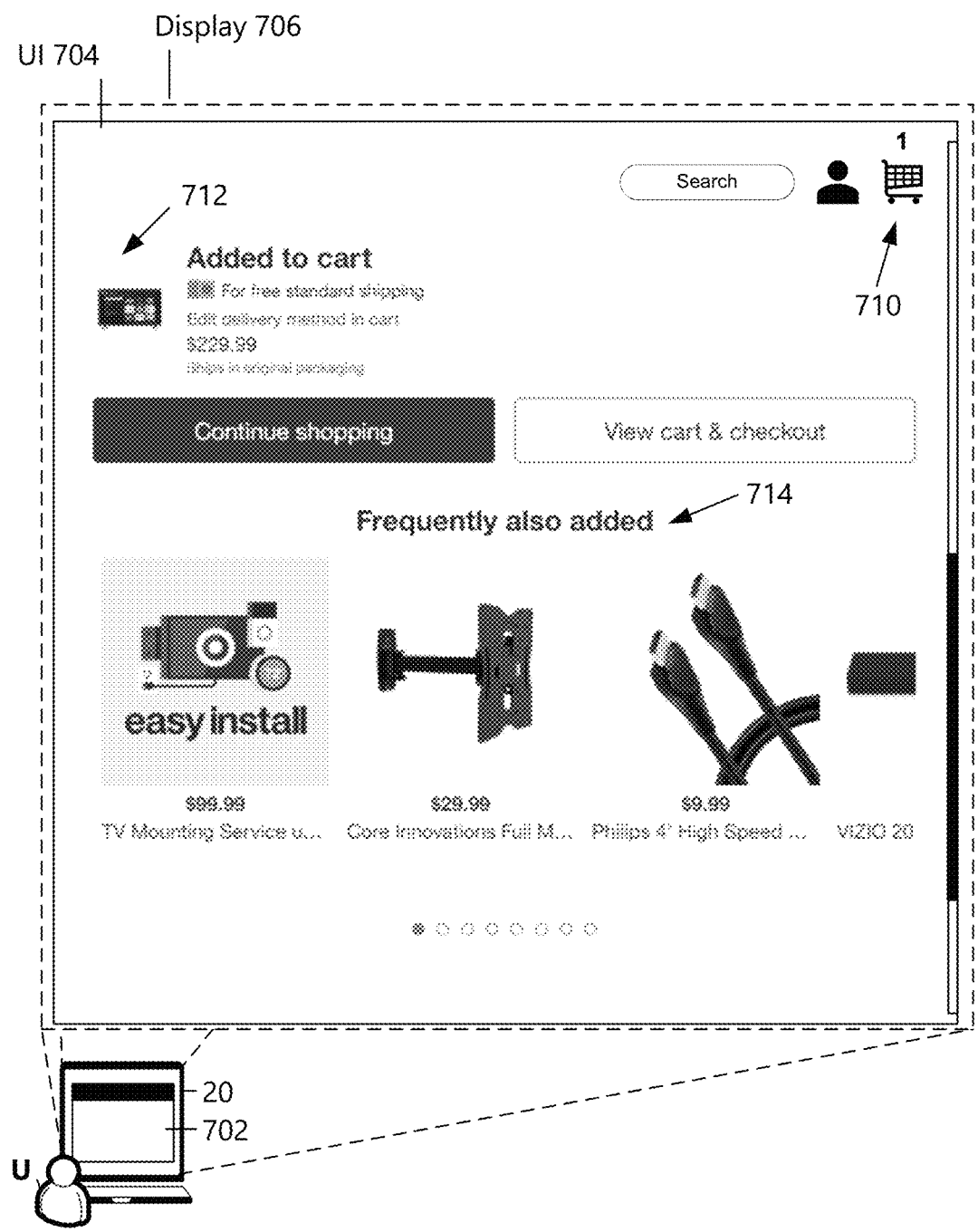
FIG. 7 illustrates an example user interface displaying a recommended product bundle, according to an example embodiment.
Figure 8:
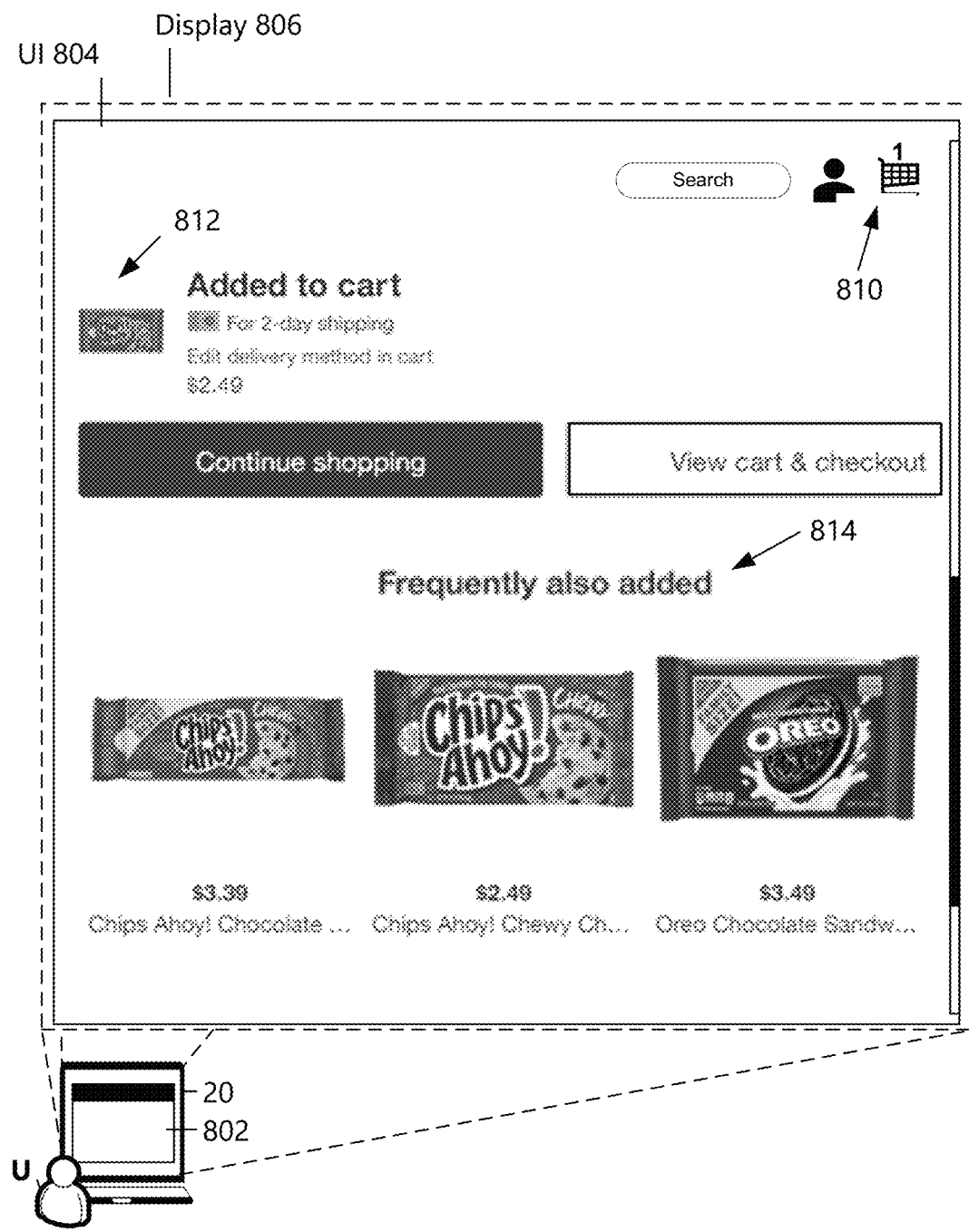
FIG. 8 illustrates an example user interface displaying a recommended product bundle, according to an example embodiment.

Now referring to FIGS. 6-8, various user interfaces are displayed. Generally, the user interfaces may be presented on a screen 602 of a computing device 20 via a user interface 604. In examples, the user interface 604 is presented on a display 606 such as a touch screen display.

FIG. 6 illustrates an example user interface 604 displaying a recommended product bundle 614 according to an example embodiment. In the example shown, a user U has selected a seed product 612, and in response, is presented a product detail page specific to that seed product. Based on the user selecting the seed product 612 and viewing the user interface 604, a product bundle 614 may be presented. In this example, the product bundle 614 is present alongside the seed product 612. The product bundle includes a product 616 complementary to the seed product 612 as determined by the product bundles recommendation server. In other examples, a product bundle may be presented as a pop-up window that is displayed in response to a user added a seed product to his or her online shopping cart. In this example, the user is presented with an option to add the entire product bundle to the online shopping cart. The price associated with each product is further presented on the user interface 604. The total price associated with the entire product bundle may also be presented on the user interface 604.

FIG. 7 illustrates another example user interface 704 displaying a recommended product bundle 714 according to an example embodiment. In the example shown, a user U has selected a seed product 712, for example by adding the seed product to his or her online shopping cart 710. Based on the user selecting the seed product 712 by adding the seed product 712 to the online shopping cart 710, a product bundle 714 is presented. In this example, the product bundle 714 includes a plurality of products complementary to the seed product 712. Moreover, the product bundle 714 includes a diverse grouping of products. The seed product in this example is a television, and the complementary products presented on the user interface include, for example, a TV mounting service, a TV wall mount, and an accessory cable. Each complementary product within the product bundle 714 may be selected, and a user may be redirected to a product page for the selected product. In other examples, the user may be able to select each complementary product within the product bundle 714 to add to his or her online shopping cart 710 with a single click and without first visiting the product detail page for each complementary product. This improves the overall shopping process, and the efficiency of that process, by removing the requirement of additional navigation steps by a customer and removing the burden of generating additional web pages/user interfaces on behalf of the retail website.

FIG. 8 illustrates another example user interface 804 displaying a recommended product bundle 814 according to an example embodiment. In the example shown, a user U has selected a seed product 812 to add to his or her online shopping cart 810. Based on the user U selecting the seed product, e.g., in this example by adding the seed product 812 to the online shopping cart 810, a product bundle 814 is presented. In this example, the product bundle 814 includes a plurality of products complementary to the seed product 712. Moreover, the product bundle 814 shown in this example includes a less diverse grouping of products. The seed product in this example is a package of cookies, and the complementary products presented on the user interface include, for example, other types of cookies.

Referring to FIGS. 6-8, it is noted that if the user U would add the seed product 612 to his or her cart 610, and subsequently add one or more product 616 from the product bundle 614, the add to cart data will be registered and the product bundle relationship between product 612, 616 may be strengthened for that user and other users when viewing the product detail page illustrated in the user interface 604. Similarly, addition of seed products 712, 812 to the cart will result in supplementing add to cart data, with products subsequently added to the cart being potentially considered as complementary to the initial or seed product.

Figure 9:
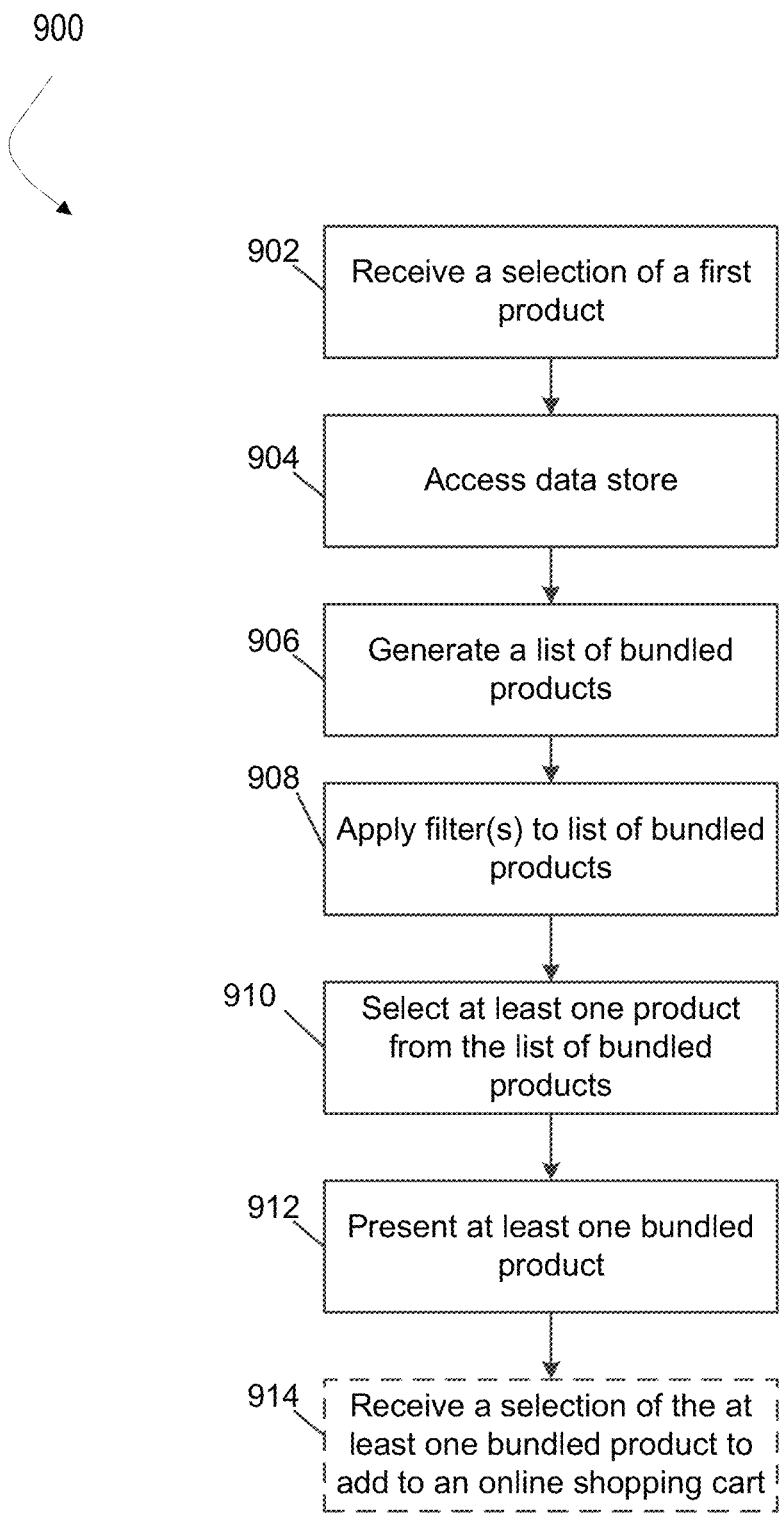
FIG. 9 illustrates a flow diagram of an example method of recommending product bundles, according to an example embodiment.

FIG. 9 illustrates a flow diagram of an example method 900 of recommending product bundles, according to an example embodiment. The method 900 may be performed, for example, by the product bundles recommendation server 106. Other networked structures may be used to implement aspects of the method 900 as well.

In the example shown. The method 900 includes receiving a selection of a first product, at operation 902. The selection is received from a customer device, which may be operated by a customer who is shopping on a retailer website. The first product is a seed product that drives the determination of what products to recommend to a customer in a product bundle. Once a first product is selected, for example by either viewing a product detail page of that product or by adding the product to the online shopping cart, a data store is accessed, at operation 904. Accessing the data store may include retrieving customer add to cart data, product price data, and degree of diversity data. The customer add to cart data is based on historical customer shopping activity and includes data describing online shopping sessions in which products are selected for addition to a historical shopping cart to which the first product was previously added. The customer add to cart data further includes data describing an order in which the products are added to the historical shopping cart to which the first product was previously added. The degree of diversity data includes product similarity data having a product similarity score between two products based on a comparison of product attributes. Based on the selection of the first product and the customer add to cart data, a list of bundled products is generated, at operation 906. The list of bundled products is generated by the product recommendation server. The list of bundled products includes a list of products that are complementary to the first product. Complementary products are identified by the complementary product identifier engine 218 and the infer complementary product engine 220 as described above, for example, with respect to FIGS. 2-5.

In examples, limiting factors or filters may be applied to the list of bundled products, at operation 908. Example filters that may be applied to the list of bundled products are described in more detail below with respect to FIG. 10. In the example shown, at least one product is selected from the list of bundled products, at operation 910. The selected product(s) from the list of bundled products is presented on a user interface on the customer device, at operation 912. Example user interfaces presented with product bundles are depicted in FIGS. 6-8. In examples, the at least one bundled product is presented alongside the first product, such that a customer can see both the seed product and the recommended product on a retail webpage. In examples, after at least one bundled product has been presented on the customer device, a selection of the at last one bundled product may be received to add the at least one bundled product to the shopping cart, at operation 914. When the at least one bundled product is selected to add to the online shopping cart, the add to cart data may be updated with information regarding the relationship between the first product and the at least one bundled product.

Figure 10:
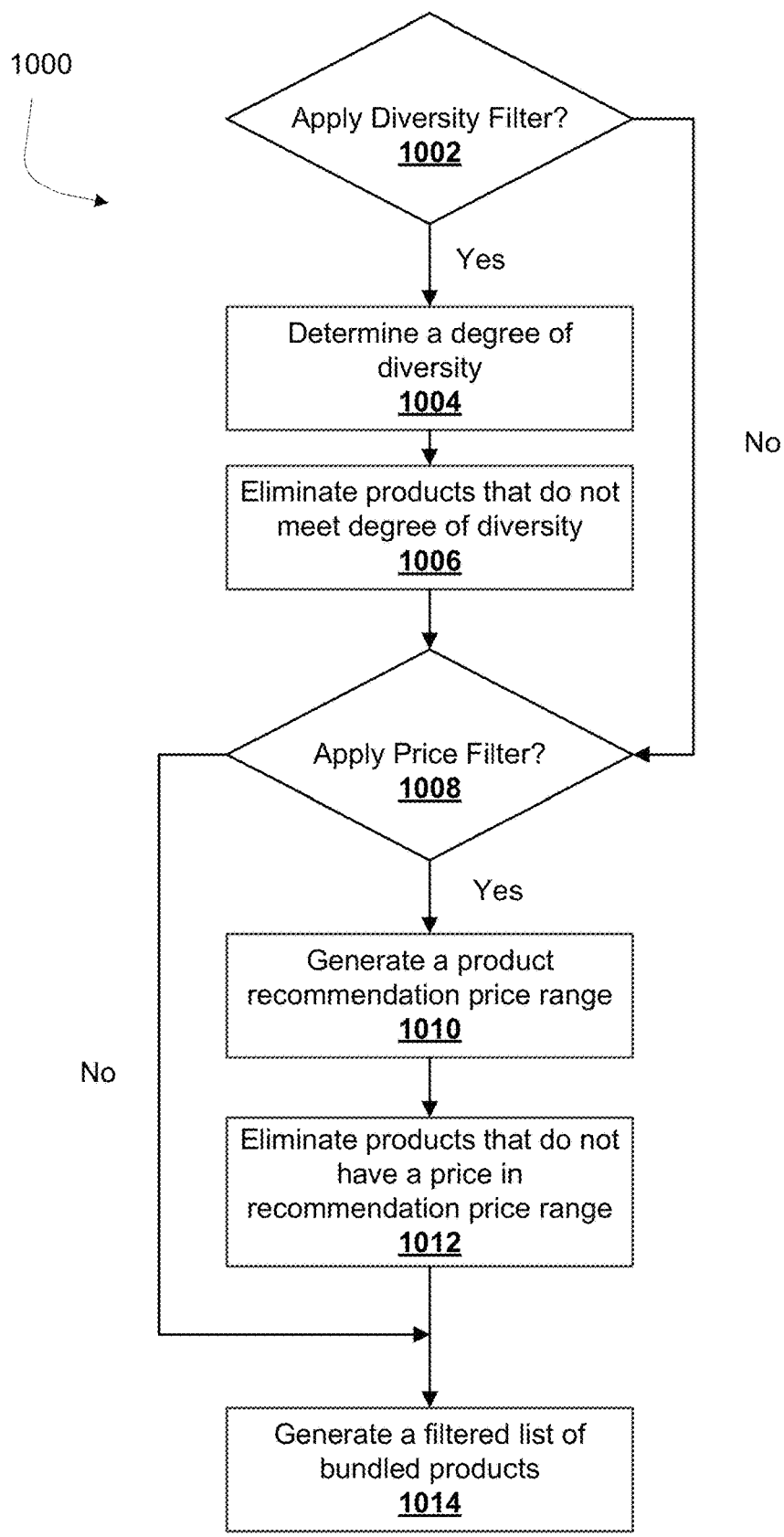
FIG. 10 illustrates a flow diagram of an example method of filtering a product bundle, according to an example embodiment.

FIG. 10 illustrates a flow diagram of an example method 1000 of filtering a product bundle, according to an example embodiment. The method 1000 may be performed, for example, by the filter application engine 224. The method 1000 may be performed as one implementation of operation 908 of the example method 900 described above with respect to FIG. 9. In the example shown, a determination of whether to apply a degree of diversity filter to the list of bundled products is made, at operation 1002. If it is determined that a degree of diversity filter should be applied, then a degree of diversity is determined, at operation 1004, based on a product category of the first product. Category information may be included in the degree of diversity data 214 stored in the databases 208. At operation 1006, based on the determined degree of diversity, products on the list of bundled products that do not meet the determined degree of diversity are eliminated from the list of bundled products.

In the example shown, a determination of whether to apply a price filter to the list of bundled products is made, at operation 1008. If it is determined that a price filter should be applied, then a product recommendation price range is generated, at operation 1010. The product recommendation price range may be generated using product price data 212 stored in a database 208. In examples, the recommendation price range may include prices above and below the price of the first product. In other examples, the upper limit of the recommendation price range may be the price of the first product such that none of the recommended products in the product bundle are more expensive than the first product. For example, if a user adds a car seat with a price of $300 to his shopping cart, a price filter may be applied to the list of bundled products and the product bundle presented to the user may only include items that cost less than $300. This is because, typically, a customer will not choose as a secondary, or bundled product, a product that is more expensive than the product that the customer is initially seeking to buy.

At operation 1012, based on the recommendation price range, products on the list of bundled products that do not have a price within the recommendation price range are eliminated from the list of bundled items. In examples, both a diversity filter and a price filter may be applied. When both a diversity filter and a price filter are applied, the resulting list of bundled products will only include items that meet the determined degree of diversity and have a price within the recommendation price range. In other examples, only one filter is applied. In even other examples, no filter is applied. After any filters are applied, a filtered list of bundled products is generated, at operation 1014. When a filter or filters are applied to a list of bundled products, at operation 910 as described above with respect to FIG. 9, selecting at least one product from the list of bundled products may include selecting at least one product from the filtered list of bundled products, as generated at operation 1014.

Figure 11:
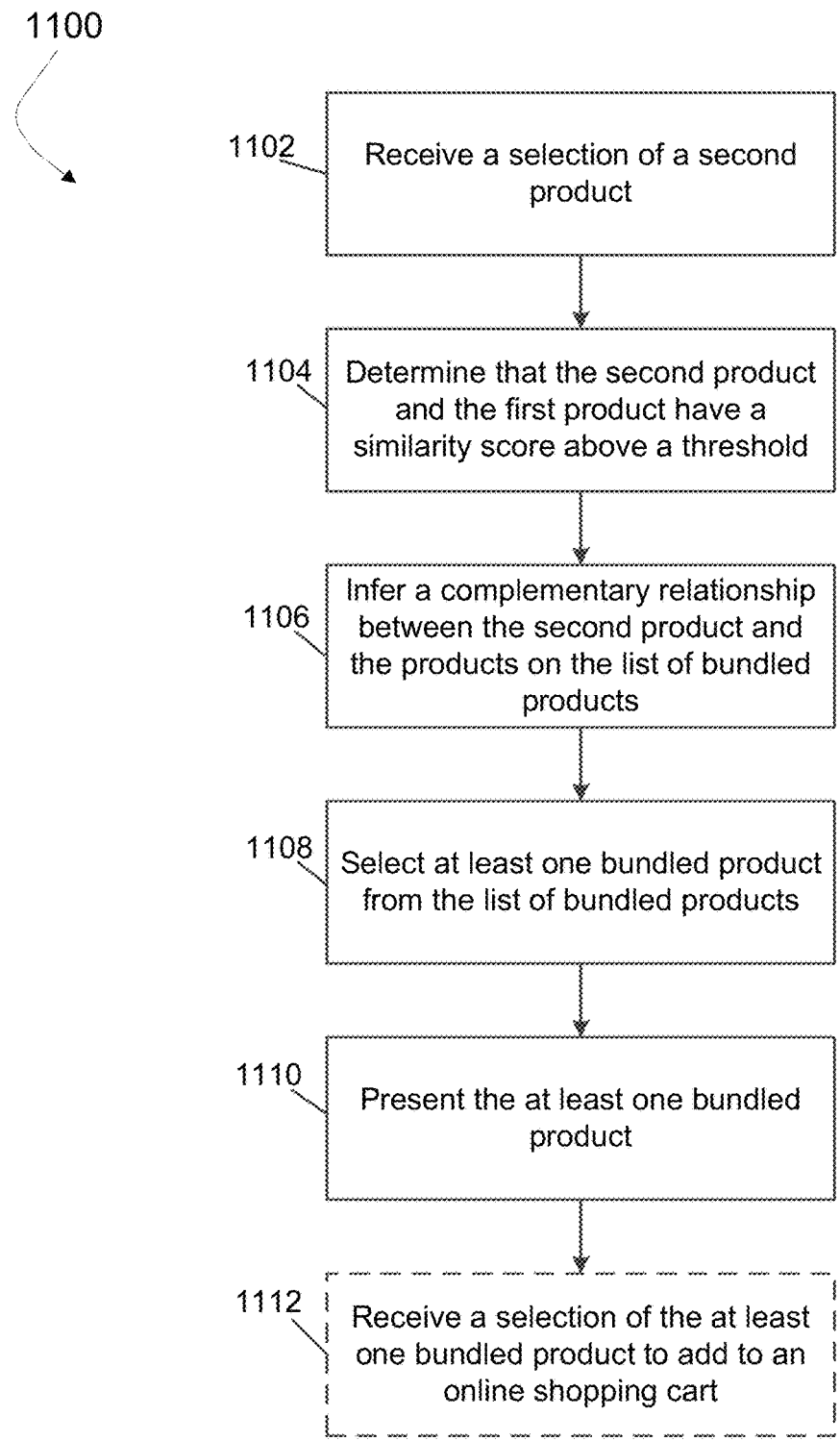
FIG. 11 illustrates a flow diagram of an example method of inferring complementary relationships to recommend a product bundle, according to an example embodiment.

FIG. 11 illustrates a flow diagram of an example method 1100 of inferring complementary relationships to recommend a product bundle, according to an example embodiment. The example method 1100 may be carried out to generate a product relationship network, such as the product relationship network 300 depicted in FIG. 3, in order to recommend a product bundle. The list of bundled products generated in method 900 at operation 906 based on the first product being selected may also be used within method 1100.

In the example shown, a selection of a second product is received, at operation 1102. The similar product identifier engine 222 may then determine that the second product and the first product have a product similarity score above a predetermined threshold, at operation 1104. The product similarity score may be based on a comparison of product attributes stored in the product attribute data 216. Based on the first product and the second product having a product similarity score above a predetermined threshold, the similar product identifier engine 222 may generate a similar product link between the first product and the second product in a product relationship network. At operation 1106, the infer complementary product engine 218 infers a complementary relationship between the second product and the products on list of bundled products generated at operation 906, based on the similar product link between the first product and the second product. At least one bundled product from the list of bundled products may then be selected, at operation 1108, and presented on the user interface, at operation 1110, alongside the second item. In examples, a selection of the at least one bundled product to add to the shopping cart may be received, at operation 1112.

Figure 12:
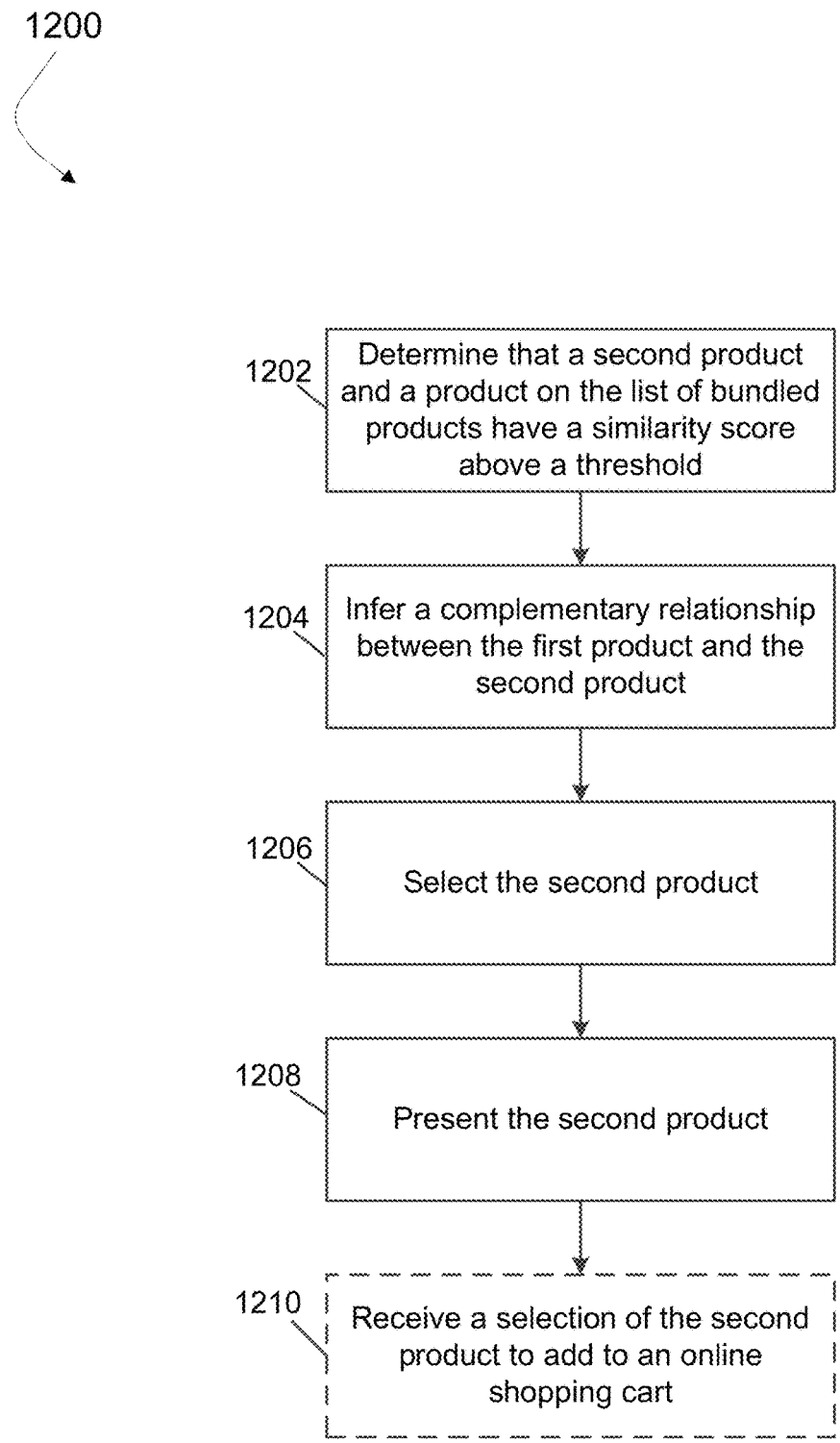
FIG. 12 illustrates a flow diagram of another example method of inferring complementary relationships to recommend a product bundle, according to an example embodiment.

FIG. 12 illustrates a flow diagram of another example method 1200 of inferring complementary relationships to recommend a product bundle, according to an example embodiment. The example method 1200 may also be carried out to generate a product relationship network, such as the product relationship network 300 depicted in FIG. 3, in order to recommend a product bundle. The list of bundled products generated in method 900 at operation 906 based on the first product being selected may also be used within method 1200. As noted above, selection of the first product may include selecting the product for display on a product detail page, or selection to add the first product to a shopping cart.

In the example shown, based on product similarity data, a determination is made as to whether the product similarity score between a second product and a product on the list of bundled products generated in method 900 at operation 906 meets a predetermined product similarity score threshold, at operation 1202. If the threshold is met, a complementary relationship is inferred between the first product and the second product, at operation 1204. Based on the first product being added to an online shopping cart and the inferred complementary relationship between the first product and the second product, the second product is selected to recommend as a bundled product with the first product, at operation 1206. The second product is then presented on the user interface on the consumer device alongside the first product, at operation 1208. In examples, a selection of the second product may be received, at operation 1210. The selection may be to view the second product, or in some instances, to add the second product to the cart without having to first visit a product detail page of the second product.

Figure 13:
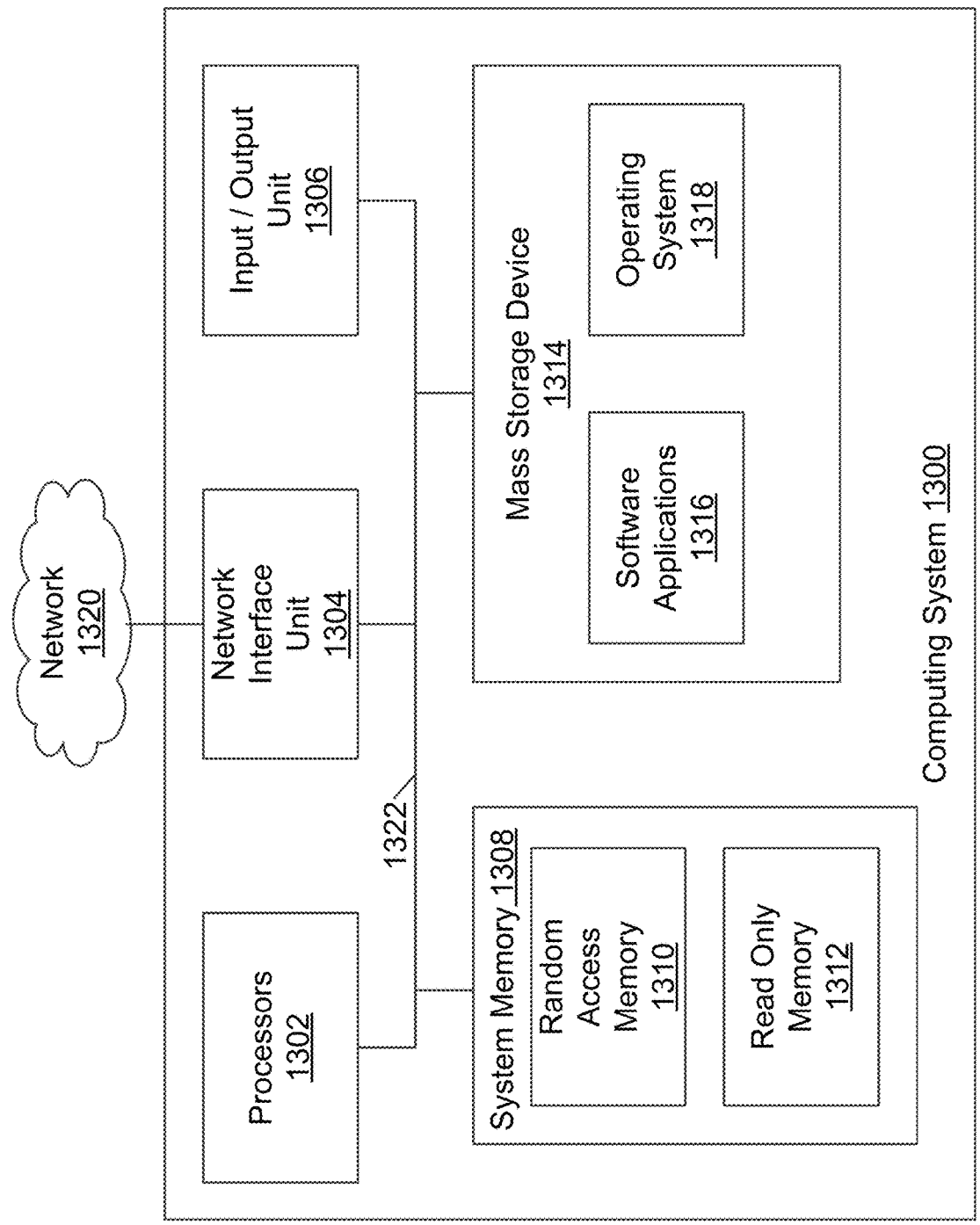
FIG. 13 illustrates a block diagram of an example computing device usable to implement aspects of the present disclosure.

FIG. 13 illustrates an example block diagram of a virtual or physical computing system 1300. One or more aspects of the computing system 1300 can be used to implement the product bundles recommendation server 106, retail server 108, or other computing systems described above in conjunction with FIG. 1.

In the embodiment shown, the computing system 1300 includes one or more processors 1302, a system memory 1308, and a system bus 1322 that couples the system memory 1308 to the one or more processors 1302. The system memory 1308 includes RAM (Random Access Memory) 1210 and ROM (Read-Only Memory) 1312. A basic input/output system that contains the basic routines that help to transfer information between elements within the computing system 1300, such as during startup, is stored in the ROM 1312. The computing system 1300 further includes a mass storage device 1314. The mass storage device 1314 is able to store software instructions and data. The one or more processors 1302 can be one or more central processing units or other processors.

The mass storage device 1314 is connected to the one or more processors 1302 through a mass storage controller (not shown) connected to the system bus 1322. The mass storage device 1314 and its associated computer-readable data storage media provide non-volatile, non-transitory storage for the computing system 1300. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1300.

According to various embodiments of the invention, the computing system 1300 may operate in a networked environment using logical connections to remote network devices through the network 1320. The network 1320 is a computer network, such as an enterprise intranet and/or the Internet. The network 1320 can include a LAN, a Wide Area Network (WAN), the Internet, wireless transmission mediums, wired transmission mediums, other networks, and combinations thereof. The computing system 1300 may connect to the network 1320 through a network interface unit 1304 connected to the system bus 1322. It should be appreciated that the network interface unit 1304 may also be utilized to connect to other types of networks and remote computing systems. The computing system 1300 also includes an input/output controller 1306 for receiving and processing input from a number of other devices, including a touch user interface display screen, or another type of input device. Similarly, the input/output controller 1306 may provide output to a touch user interface display screen or other type of output device.

As mentioned briefly above, the mass storage device 1314 and the RAM 1310 of the computing system 1300 can store software instructions and data. The software instructions include an operating system 1318 suitable for controlling the operation of the computing system 1300. The mass storage device 1314 and/or the RAM 1310 also store software instructions, that when executed by the one or more processors 1302, cause one or more of the systems, devices, or components described herein to provide functionality described herein. For example, the mass storage device 1314 and/or the RAM 1310 can store software instructions that, when executed by the one or more processors 1302, cause the computing system 1300 to receive and execute managing network access control and build system processes.

In accordance with the present disclosure, and as reflected in the embodiments below, the present product bundles recommendation system has a number of technical advantages over existing systems as well as the efficiency advantages described above. In particular, referring to FIGS. 1-13 overall, in particular the product bundles recommendation server, can allow retailers to provide broad or fine-grained control over product bundles recommended to consumers while they are shopping online on a retailer website. Specifically, a retailer may apply no filters, one filter, or multiple filters to a list of bundled products depending on the goals of the retailer. Additionally, the ability to train a model using known relationships between products to identify hidden links in a product relationship network and to infer complementary relationships between products is advantageous over existing systems for recommending products. By analyzing multi-step pathways between pairs of products that are connected by at least one complementary link or edge, additional complementary relationships can be inferred, which makes the present system more scalable and efficient than traditional systems. Furthermore, the present system incorporates an automated feedback data flow that returns to the product bundles recommendation server real-time updates to add to cart data, so the product bundles recommendation server can dynamically update a product relationship network defining product relationships as additional complementary relationships become known.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A system for providing a product recommendation on a retailer website, the system comprising:
    a computing system including a data store, a processor, and a memory communicatively coupled to the processor, the memory storing instructions executable by the processor to:
       receive, from a customer device, a selection of a first product offered for sale via the retailer website;
       access the data store to retrieve customer add to cart data, product price data, and degree of diversity data, wherein:
          the customer add to cart data is based on historical customer shopping activity of a plurality of customers and includes data describing online shopping sessions in which products are selected for addition to historical shopping carts to which the first product was previously added,
          the customer add to cart data further includes data describing an order in which the products are added to the historical shopping carts to which the first product was previously added, and
          the degree of diversity data comprises:
             product category information associated with the first product; and
             product similarity data associated with the product category information, including a product similarity score between two products based on a comparison of product attributes;
       based on the selection of the first product and the customer add to cart data, generate a list of bundled products having a complementary relationship with the first product, wherein, generating the list of bundled products comprises:
       provide the customer add to cart data as input to a machine-learning model comprising a graph neural network that processes the add to cart data to predict the probability of a complementary relationship between pairs of products of a plurality of products, wherein the machine learning model is trained based on existing add to cart data,
          wherein training the machine learning model comprises:
             determining existing edges from the existing add to cart data, wherein the plurality of edges connect the plurality of nodes and identify relationships between connected nodes; and
             exchanging information between a plurality of nodes of the graph neural network, causing a hidden state of each of the plurality of nodes to evolve; and
             sharing weights across each of the plurality of nodes; and
          wherein processing the add to cart data comprises predicting the probability of the complementary relationship between pairs of products within the graph neural network, wherein processing the add to cart data comprises predicting the probability of an edge between two nodes within the graph neural network for which a relationship is not otherwise derived directly from the add to cart data; and
       receive the probability of a complementary relationship between at least one pair of products as output from the machine-learning model, wherein one product in the at least one pair of products is the first product;
       based on the probability of a complementary relationship being above a predetermined threshold, select at least one bundled product from the list of bundled products;
       present the at least one bundled product on a user interface on the customer device as a recommendation for purchase with the first product;
       based on presenting the at least one bundled product on the user interface, receive, from the customer device, a selection of the at least one bundled product to add to the online shopping cart;
       based on the selection of the at least one bundled product, automatically update the customer add to cart data; and
       dynamically train the machine learning model and updating the graph neural network based on the updated add to cart data.

2. The system of claim 1, the memory storing instructions further executable by the processor to:
    based on the product category information of the first product, determine a degree of diversity for the product recommendation; and
    based on the degree of diversity data and the determined degree of diversity for the product recommendation, select from the list of bundled products at least one bundled product that meets the determined degree of diversity, wherein the least one bundled product presented on the user interface is the selected bundled product that meets the determined degree of diversity.

3. The system of claim 1, the memory storing instructions further executable by the processor to:
  receive, from a customer device, a selection of a second product offered for sale via the retailer website;
  based on the product similarity data, determine whether a product similarity score between the second product and the first product meets a predetermined product similarity score threshold;
  based on the determination that the predetermined product similarity score threshold is met, infer a complementary relationship between the second product and the products on the list of bundled products associated with the first product;
  based on the inferred complementary relationships, select at least one bundled product from the list of bundled products associated with the first product to present on the user interface as a recommendation for purchase with the second product.

4. The system of claim 1, the memory storing instructions further executable by the processor to:
  based on the product similarity data, determine whether the product similarity score between a second product and a product on the list of bundled products meets a predetermined product similarity score threshold;
  based on the determination that the predetermined product similarity score threshold is met, infer a complementary relationship between the first product and the second product;
  based on receiving the selection of the first product and the inferred complementary relationship, present the second product on the user interface on the consumer device as a recommendation for purchase with the first product.

5. The system of claim 1, the memory storing instructions further executable by the processor to:
  based on a price of the first product, generate a product recommendation price range, wherein the at least one bundled product presented on the user interface is a product having a price within the product recommendation price range.

6. The system of claim 2, wherein the product category of the first product is a first category, the degree of diversity for the product recommendation is above a predetermined diversity threshold, and the first product and the at least one bundled product have a product similarity score below a predetermined product similarity score threshold.

7. The system of claim 2, wherein the product category of a second product is a second category different from the first category, the degree of diversity for the product recommendation is below a predetermined diversity threshold, and the first product and the at least one bundled product have a product similarity score above a predetermined product similarity score threshold.

8. The system of claim 2, the memory storing instructions further executable by the processor to:
  based on a price of the first product, generate a product recommendation price range, wherein the at least one bundled product presented on the user interface is a product having a price within the product recommendation price range.

9. The system of claim 5, wherein an upper limit of the product recommendation price range is the price of the first product.

10. The system of claim 1, wherein the customer shopping activity includes an online purchase of at least one product.

11. The system of claim 1, wherein the customer add to cart data includes a timestamp corresponding to a time at which products are added to the historical shopping carts to which the first product was previously added.

12. The system of claim 1, wherein selecting the first item comprises placing the first product in a customer shopping cart, the system further including instructions executable to:
  receive a selection, via the user interface, of the second product; and
  adding the second product to the customer shopping cart without requiring navigating to a product detail page of the second product.

13. A method for providing a product recommendation, the method comprising:
  receiving, from a customer device, a selection of a first product offered for sale via a retailer website;
  accessing a data store to retrieve customer add to cart data, product price data, and degree of diversity data, wherein:
    the customer add to cart data is based on historical customer shopping activity and includes data describing online shopping sessions in which products are selected for addition to a historical shopping cart to which the first product was previously added,
    the customer add to cart data further includes data describing an order in which the products are added to the historical shopping cart to which the first product was previously added, and
    the degree of diversity data comprises:
      product category information associated with the first product; and
      product similarity data associated with the product category information, including a product similarity score between two products based on a comparison of product attributes;
  based on the selection of the first product and the customer add to cart data, generating a list of bundled products, wherein the list of bundled products includes one or more additional products that have a predicted probability of a complementary relationship, wherein generating the list of bundled products comprises:
    providing the customer add to cart data as input to a machine-learning model comprising a graph neural network that processes the add to cart data to predict the probability of a complementary relationship between pairs of products of a plurality of products, wherein the machine learning model is trained based on existing add to cart data,
    wherein training the machine learning model comprises:
      determining existing edges from the existing add to cart data, wherein the plurality of edges connect the plurality of nodes and identify relationships between connected nodes; and
      exchanging information between a plurality of nodes of the graph neural network, causing a hidden state of each of the plurality of nodes to evolve; and
      sharing weights across each of the plurality of nodes; and
    wherein processing the add to cart data comprises predicting the probability of the complementary relationship between pairs of products within the graph neural network, wherein processing the add to cart data comprises predicting the probability of an edge between two nodes within the graph neural network for which a relationship is not otherwise derived directly from the add to cart data; and receiving the probability of a complementary relationship between at least one pair of products as output from the machine-learning model, wherein one product in the at least one pair of products is the first product;

based on the probability of a complementary relationship being above a predetermined threshold, selecting at least one bundled product from the list of bundled products;

presenting the at least one bundled product on a user interface on the customer device as a recommendation for purchase with the first product;

based on presenting the at least one bundled product on the user interface, receiving, from the customer device, a selection of the at least one bundled product to add to the online shopping cart;

based on the selection of the at least one bundled product, automatically updating the customer add to cart data; and dynamically training the machine learning model and updating the graph neural network based on the updated add to cart data.

14. The method of claim 13, the method further comprising:

based on the product category information of the first product, determining a degree of diversity for the product recommendation; and based on the degree of diversity data and the determined degree of diversity for the product recommendation, selecting from the list of bundled products at least one bundled product that meets the determined degree of diversity, wherein the least one bundled product presented on the user interface is the selected bundled product that meets the determined degree of diversity.

15. The method of claim 13, the method further comprising:

receiving, from a customer device, a selection of a second product; and based on the product similarity data, determining whether a product similarity score between the second product and the first product meets a predetermined product similarity score threshold;

based on the determination that the predetermined product similarity score threshold is met, inferring a complementary relationship between the second product and the products on the list of bundled products associated with the first product; and based on the inferred complementary relationships, selecting at least one bundled product from the list of bundled products associated with the first product to present on the user interface as a recommendation for purchase with the second product.

16. The method of claim 13, the method further comprising:

based on the product similarity data, determining whether the product similarity score between a second product and a product on the list of bundled products meets a predetermined product similarity score threshold;

based on the determination that the predetermined product similarity score threshold is met, inferring a complementary relationship between the first product and the second product;

based on receiving the selection of the first product and the inferred complementary relationship, presenting the second product on the user interface on the consumer device as a recommendation for purchase with the first product.

17. The method of claim 13, the method further comprising:

based on a price of the first product, generating a product recommendation price range, wherein the at least one bundled product presented on the user interface is a product having a price within the product recommendation price range.

18. The method of claim 13, wherein the graph neural network represents the plurality of products as a graph, and the graph includes:

the plurality of nodes, wherein the plurality of nodes correspond to each product within the plurality of products; and the plurality of edges.

19. A system comprising:

a computing system including a data store, a processor, and a memory communicatively coupled to the processor, the memory storing instructions executable by the processor to:

receive, from a customer device, a selection of a first product offered for sale via a retailer website;

access the data store to retrieve customer add to cart data, product price data, and degree of diversity data, wherein:

the customer add to cart data is based on historical customer shopping activity and includes data describing online shopping sessions in which products are selected for addition to a historical shopping cart to which the first product was previously added, the customer add to cart data further includes data describing an order in which the products are added to the historical shopping cart to which the first product was previously added, and the degree of diversity data comprises:

product category information associated with the first product; and product similarity data associated with the product category information, having a product similarity score between two products based on a comparison of product attributes;

based on the selection of the first product and the customer add to cart data, generate a list of bundled products, wherein the list of bundled products includes one or more additional products that have a predicted probability of a complementary relationship, wherein generating the list of bundled products comprises:

providing the customer add to cart data as input to a machine-learning model comprising a graph neural network that processes the add to cart data to predict the probability of a complementary relationship between pairs of products of a plurality of products, wherein the machine learning model is trained based on existing add to cart data, wherein training the machine learning model comprises:

determining existing edges from the existing add to cart data, wherein the plurality of edges connect the plurality of nodes and identify relationships between connected nodes; and exchanging information between a plurality of nodes of the graph neural network, causing a hidden state of each of the plurality of nodes to evolve; and sharing weights across each of the plurality of nodes; and wherein processing the add to cart data comprises predicting the probability of the complementary relationship between pairs of products within the graph neural network, wherein processing the add to cart data comprises predicting the probability of an edge between two nodes within the graph neural network for which a relationship is not otherwise derived directly from the add to cart data; and receiving the probability of a complementary relationship between at least one pair of products as output from the machine-learning model, wherein one product in the at least one pair of products is the first product;

based on a price of the first product, generate a product recommendation price range;

based on the product category information of the first product, determine a degree of diversity for the product recommendation;

select from the list of bundled products at least one bundled product, the selected at least one bundled product, wherein the at least one bundled product has a price within the product recommendation price range, meets the determined degree of diversity, and has a probability of a complementary relationship with the first product that is above a predetermined threshold; and present the at least one bundled product on a user interface on the customer device as a recommendation for purchase with the first product;

based on presenting the at least one bundled product on the user interface, receive, from the customer device, a selection of the at least one bundled product to add to the online shopping cart;

based on the selection of the at least one bundled product, automatically update the customer add to cart data; and dynamically train the machine learning model and updating the graph neural network based on the updated add to cart data.

* * * * *